United States Patent [19]

Thompson

[11] Patent Number: 4,572,435
[45] Date of Patent: Feb. 25, 1986

[54] FOAMABLE LIQUID DISTRIBUTING MEANS

[75] Inventor: Thomas K. Thompson, Granville, Ohio

[73] Assignee: Owens-Corning Fiberglas Corporation, Toledo, Ohio

[21] Appl. No.: 615,404

[22] Filed: May 30, 1984

[51] Int. Cl.$^4$ ............................................. B05B 1/14
[52] U.S. Cl. .................................. 239/553.5; 239/565; 239/590.5; 137/561 A; 366/341
[58] Field of Search .................. 239/553.5, 565, 590.5; 264/45.8, 46.2, 46.3, 51, 54, 303; 366/341; 425/224, 817 C; 138/37, 39, 42, 178, DIG. 11; 156/77, 78, 173; 162/118, 155, 183, 284, 334, 336; 428/304.4; 137/561 A; 406/181

[56] References Cited

U.S. PATENT DOCUMENTS

| | | | |
|---|---|---|---|
| 3,020,579 | 2/1962 | O'Connor | 239/565 |
| 3,368,936 | 2/1968 | De Long | 162/118 |
| 4,268,236 | 5/1981 | Peille | 264/46.2 |
| 4,390,281 | 6/1983 | Scriminger | 366/341 |
| 4,410,281 | 10/1983 | Crookes | 366/341 |
| 4,422,773 | 12/1983 | Cassaday et al. | 366/341 |

Primary Examiner—Andres Kashnikow
Assistant Examiner—James R. Moon, Jr.
Attorney, Agent, or Firm—Ronald C. Hudgens; Ted C. Gillespie; Paul J. Rose

[57] ABSTRACT

A foamable liquid distributing apparatus comprising a composite block formed of two parts removably secured together and having an inlet passageway and a plurality of spaced outlet passageways. A plurality of connecting passageways respectively connect the outlet passageways to inlet passageway, with each of the connecting passageways being provided with a plurality of turbulence-producing bends to inhibit build-up of foam.

6 Claims, 13 Drawing Figures

FOAMABLE LIQUID DISTRIBUTING MEANS

TECHNICAL FIELD

This invention relates generally to the production of foam boards, and more particularly, to foamable liquid distributing means useful in such production.

BACKGROUND ART

When a polyol with a fast-acting catalyst is mixed with isocyanate in a mixing block and the mixed foamable liquid is dispensed at spaced points on a traveling substrate which forms a facing on the finished foam board, foam tends to build up on the inner walls of the conduits by which the foamable liquiud is distributed from the mixing block to the substrate. The fast-acting catalyst is dictated by the requirement of economy in production. In actual practice, before my invention, the build-up of foam caused blockages in twenty to thirty minutes, requiring shut-down of the production line for cleaning of the conduits.

DISCLOSURE OF THE INVENTION

In accordance with the invention, turbulence-producing bends are provided in the conduits to provide turbulent flow and reduce the tendency of the foam to build up on the conduit walls. The number of such bends in each conduit connecting an outlet to the inlet from the mixing block is in excess of the number required merely to make the connection. As a result, the form board production line can now be run for about seventeen hours before clean-out of the conduits is necessary.

BRIEF DESCRIPTION OF DRAWINGS

The invention is more fully explained hereinafter, reference being had to the accompanying drawings in which.

BEST MODE OF CARRYING OUT THE INVENTION

Figure 1:
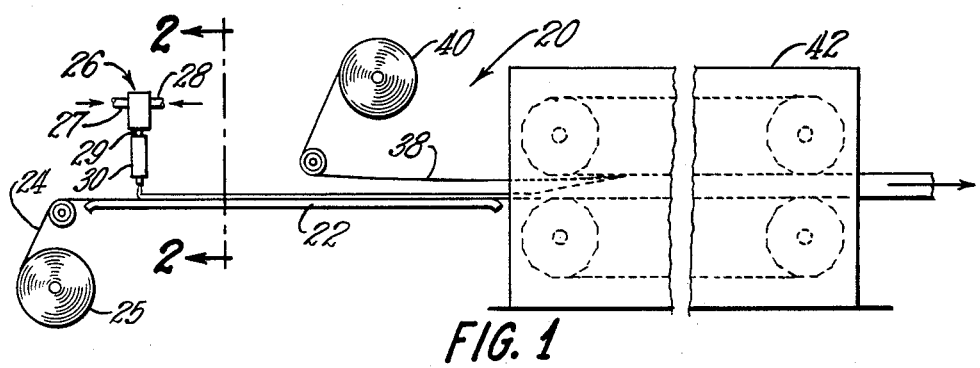
FIG. 1 is a fragmentary schematic elevational view of foam board manufacturing apparatus constructed in accordance with the invention.
Figure 2:
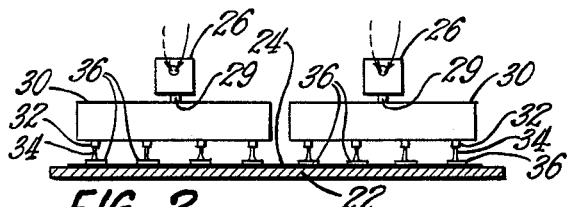
FIG. 2 is a sectional view taken generally along the line 2—2 of FIG. 1.

With reference to the drawings, FIG. 1 fragmentarily shows a production line 20 for manufacturing foam boards and including a support plate 22 for a travelling substrate 24 supplied from a roll 25. A pair of conventional mixing blocks 26 each having two supply conduits 27 and 28 for foamable liquid components is provided. As best shown in FIG. 2, each mixing block 26 has an outlet connected by a nipple 29 to a distributing block 30 constructed in accordance with the invention. Each distributing block 30 is provided with four outlet fittings 32 for respectively supplying four streams 34 to form four strips 36 of foamable liquid on the substrate 24. An upper facing 38 is supplied from a roll 40. The substrate 24 with the strips 36 of foamable liquid thereon and the facing 38 pass through a conveyor-type oven 42 wherein foaming and curing of the foamable liquid takes place to form foam board material which is cut to desired lengths farther downstream by a conventional travelling band saw (not shown) or other suitable means.

Figure 3:
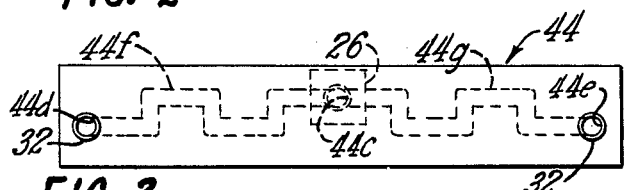
FIGS. 3, 4, and 5 are an elevational view from a front or downstream side, a plan view, and an end elevational view, respectively, of one form of a foamable liquid distributing block constructed in accordance with the invention and having a conventional foamable liquid mixing block connected to an inlet passageway thereof, flow through the distributing block being generally horizontal.
Figure 4:
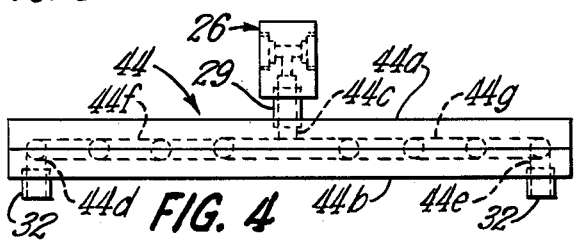
Figure 5:
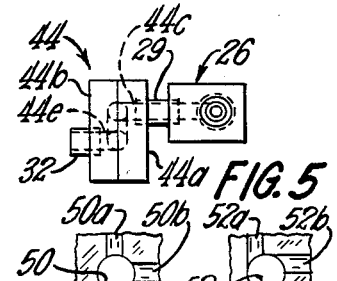

FIGS. 3–5 show a two-outlet, generally horizontally feeding, distributing block 44 connected to one of the conventional mixing blocks 26. The distributing block 44 includes two parts 44a and 44b removably secured together by suitable fastening or clamping means (not shown). A nipple 29 connects the mixing block 26 to an inlet passageway 44c in the part 44a. The half 44b is provided with a pair of spaced outlet fittings 32 mounted respectively in a pair of spaced outlet passageways 44d and 44e. The inlet passageway 44c is connected to the outlet passageway 44d by a passageway 44f and to the outlet passageway 44e by a passageway 44g. The passageways 44f and 44g are each formed half in the part 44a and half in the part 44b, and each is provided with a plurality of right-angle bends, as best shown in FIG. 3.

Figure 6:
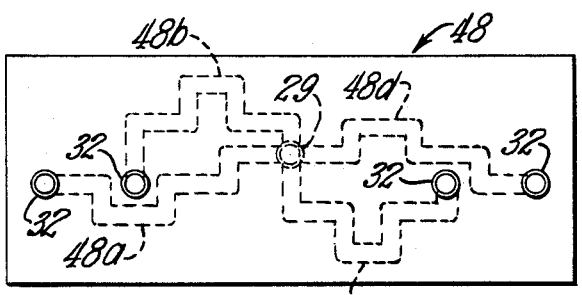
FIG. 6 is an elevational view similar to FIG. 3, but illustrating another embodiment of the distributing means of the invention.

FIG. 6 discloses a four-outlet, generally horizontally feeding, distributing block 48 similar to the distributing block 44 except that it has four outlet fittings 32 mounted respectively in four spaced outlet passageways connected to an inlet passageway aligned with an inlet nipple 29 respectively by four passageways 48a, 48b, 48c, and 48d each provided with a plurality of right-angle bends. The block 48 is also formed in two parts removably secured together by suitable fastening or clamping means (not shown), with the passageways 48a, 48b, 48c, and 48d being formed half in one part and half in the other part.

Figures 7, 8:
FIGS. 7, 8, and 9 are fragmentary views of an inner face of a split mixing block construced in accordance with the invention and respectively illustrating various turbulence-producing bends which may be provided in the flow path of foamable liquid.
Figure 9:

Instead of right-angle bends, passageway junctions may be provided with circular chambers, such as chamber 50 with passageway branches 50a and 50b extending radially therefrom, as shown in FIG. 7, or chamber 52, with passageway branches 52a and 52b extending tangentially therefrom, as shown in FIG. 8, or the passageways may be provided with a generally Z-shaped configuration, such as the passageway 54 shown in FIG. 9.

Figures 10, 11:
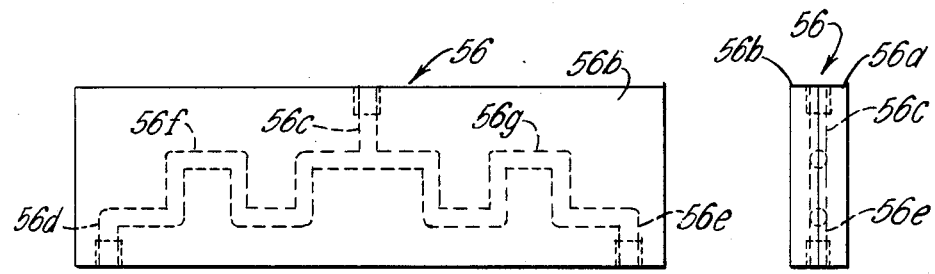
FIGS. 10 and 11 are front and end elevational views of another form of a foamable liquid distributing block constructed in accordance with the invention, flow therethrough being generally vertical.

FIGS. 10 and 11 disclose a two-outlet, generally vertically feeding, distributing block 56 formed in two parts 56a and 56b removably secured together by suitable fastening or clamping means (not shown) and having an inlet passageway 56c and a pair of spaced outlet passageways 56d and 56e. The inlet passageway 56c is connected to the outlet passageway 56*d* by a passageway 56*f* and to the outlet passageway 56*e* by a passageway 56*g*. The passageways 56*c*, 56*d*, 56*e*, 56*f* and 56*g* are each formed half in the part 56*a* and half in the part 56*b*. The passageways 56*f* and 56*g* are each provided with a plurality of right-angle bends. The inlet passageway 56*c* is adapted to threadedly receive a nipple 29 for connection to a mixing block 26, and the outlet passageways 56*d* and 56*e* are respectively adapted to threadedly receive outlet fittings such as the outlet fittings 32.

Figure 12:
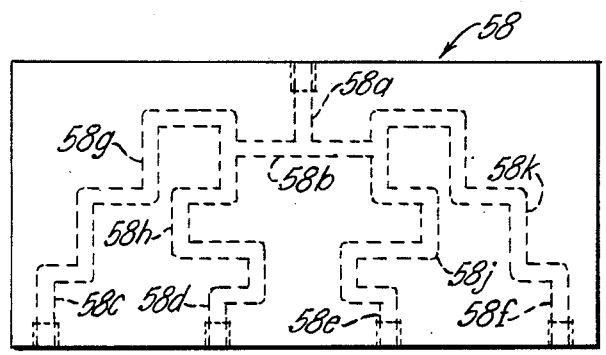
FIG. 12 is an elevational view similar to FIG. 10, but illustrating another embodiment of the distributing means of the invention.

FIG. 12 discloses a generally vertically feeding distributing block 58 similar to the block 56 except that it has four outlet passageways 58*c*, 58*d*, 58*e*, and 58*f*. The outlet passageways 58*c* and 58*d* are connected respectively by a pair of passageways 58*g* and 58*h* to one end of a straight intermediate passageway 58*b* centrally connected to an inlet passageway 58*a*. The outlet passageways 58*e* and 58*f* are connected respectively by a pair of passageways 58*j* and 58*k* to an opposite end of the straight intermediate passageway 58*b*. The inlet passageway 58*a* is adapted to threadedly receive a nipple 29 for connection to a mixing block 26, and the outlet passageways 58*c*, 58*d*, 58*e* and 58*f* are respectively adapted to threadedly receive outlet fittings such as the outlet fittings 32. The block 58 is formed in two parts with half of each of passageways 58*a*–58*k* in one part and half in the other part. Each of the passageways 58*g*, 58*h*, 58*j* and 58*k* is provided with a plurality of right-angle bends. The block 58 represents a suitable construction for the previously discussed distributing block 30.

Figure 13:
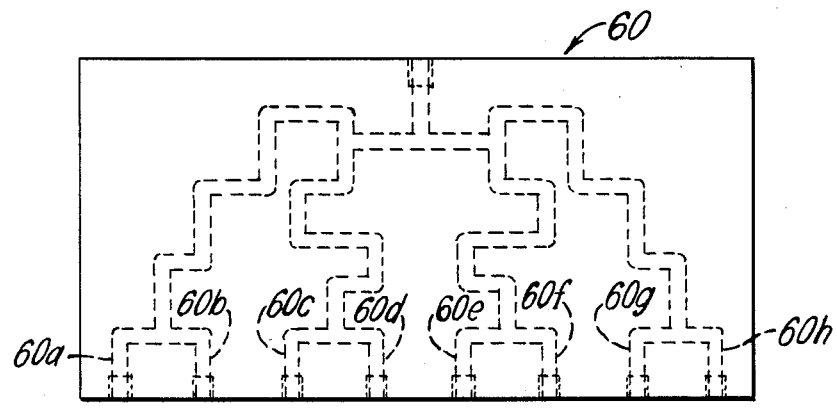
FIG. 13 is an elevational view similar to FIGS. 10 and 12, but illustrating yet another embodiment of the distributing means of the invention.

FIG. 13 shows a distributing block 60 similar to the block 58 except that in FIG. 13, each of the outlet passageways like passageways 58*c*, 58*d*, 58*e* and 58*f* of FIG. 12 is further bifurcated to provide a total of eight outlet passageways 60*a* through 60*h*.

Instead of providing right-angle bends every few inches in passageways in otherwise solid blocks, the invention may also be practiced using conventional piping with ninety-degree elbows or tees every few inches to provide turbulence and inhibit blockages of built-up foam. The two-part blocks are preferred, however, for easier removal of build-up foam.

The distributing blocks may be metal or plastic and channels may be end-milled in the two parts to form the passageways when the parts are secured together. In each distributing block, the length of a passageway connecting the inlet with an outlet is preferably substantially the same as for any other passageway connecting the inlet with another outlet, and the number of bends in each of such passageways is the same.

I claim:

1. Foamable liquid distributing means comprising a composite block formed of two parts removably secured together and having an inlet passageway adapted to be connected to a mixing block for foamable liquid components, a plurality of spaced outlet passageways adapted to dispense foamable liquid in spaced strips onto a moving substrate material, and a plurality of connecting passageways respectively connecting said outlet passageways to said inlet passageway, each of said connecting passageways being circular in cross section and formed axially substantially half in one part of said composite block and half in the other part of said composite block and having a plurality of turbulence-producing bends therein for producing turbulence in foamable liquid flowing therethrough and thereby inhibiting build-up of foam therein, and the number of said bends being greater than would normally be required in the connection of the respective outlet passageway to the inlet passageway.

2. Foamable liquid distributing means as claimed in claim 1 wherein the inlet passageway is in one of the parts of said composite block and the outlet passageways are in the other part of said composite block.

3. Foamable liquid dispensing means as claimed in claim 1 wherein the inlet passageway and the outlet passageways are axially substantially half in one part of said composite block and half in the other part of said composite block.

4. Foamable liquid dispensing means as claimed in claim 1 wherein there are at least four of said bends in each of said connecting passageways.

5. Foamable liquid dispensing means as claimed in claim 1 wherein there are at least six of said bends in each of said connecting passageways.

6. Foamable liquid dispensing means as claimed in claim 1 wherein said turbulence-producing bends are substantially ninety-degree bends.

* * * * *